United States Patent [19]

Sulcek et al.

[11] Patent Number: 4,518,142
[45] Date of Patent: May 21, 1985

[54] SUPPORT AND LEVELING SYSTEM FOR REFUSE COMPACTOR

[75] Inventors: Charles E. Sulcek, Boyle County; Frank E. Miller, Mercer County, both of Ky.

[73] Assignee: Whirlpool Corporation, Benton Harbor, Mich.

[21] Appl. No.: 285,398

[22] Filed: Jul. 20, 1981

[51] Int. Cl.³ .......................... F16M 13/00
[52] U.S. Cl. ................... 248/649; 248/188.2
[58] Field of Search ............ 248/188.2, 649; 100/100

[56] References Cited

U.S. PATENT DOCUMENTS

| | | |
|---|---|---|
| 1,520,116 | 12/1924 | Buchter . |
| 2,033,207 | 3/1936 | Schultz . |
| 2,194,366 | 3/1940 | Ott .................................. 248/649 |
| 2,281,769 | 5/1942 | Hochriem ...................... 248/649 |
| 2,375,872 | 5/1945 | Ress ............................... 248/188.2 |
| 2,524,819 | 10/1950 | McKean ..................... 248/188.2 X |
| 2,793,467 | 5/1957 | Matter . |
| 2,932,122 | 4/1960 | Matter .......................... 248/649 X |
| 2,968,454 | 1/1955 | Meyer . |
| 2,979,857 | 4/1961 | Longbotham ................ 248/649 X |
| 3,393,846 | 7/1968 | Cannon et al. ............... 248/188.2 |
| 3,750,989 | 8/1973 | Bergeson .................. 248/188.2 X |
| 3,753,400 | 8/1973 | Miller ............................... 100/100 |
| 3,868,903 | 3/1975 | Montalbano ..................... 100/100 |
| 3,927,853 | 12/1975 | Guth ............................... 248/188.2 |
| 3,968,949 | 7/1976 | Romano . |
| 4,068,815 | 1/1978 | Losert ............................ 248/188.2 |

Primary Examiner—William H. Schultz
Attorney, Agent, or Firm—Wood, Dalton, Phillips, Mason & Rowe

[57] ABSTRACT

A support and leveling system for use in a refuse compactor or similar appliance providing facilitated adjustment when the compactor is being installed in a normal under-counter installation. The support and leveling mechanism permits the compactor to be slid easily into position and permits further adjustment of the front leveling mechanism without requiring removal of the compactor from the under-counter installation. The support and leveling mechanism acts directly against the structural frame of the compactor so as to transmit the compactor load directly downwardly through the leveling element thereof. A friction means may be mounted to the mechanism to provide a non-slip support when desired. The mechanism may include adjustable rear rollers for further adjusting the elevation of the rear portion of the compactor in the installed disposition.

30 Claims, 11 Drawing Figures

SUPPORT AND LEVELING SYSTEM FOR REFUSE COMPACTOR

BACKGROUND OF THE INVENTION

1. Field of the Invention

This invention relates to refuse compactors and in particular to means for supporting and leveling such compactors for under-counter installations.

2. Description of the Background Art

In one form of refuse compactor, the apparatus is installed in an under-counter or similar confined space. It has been conventional to slide the appliance into the space on the subjacent floor. In such installations, it has been conventionally necessary to adjust the support means of the appliance so as to position the appliance in the space at a desired height and in a level disposition. A number of different devices have been developed to provide for such adjustment, but have had a number of serious disadvantages.

Illustratively, in U.S. Pat. No. 1,520,116 of Henry Buchter, a caster is disclosed which may be adjusted to compensate for unevenness in floors and the like. In the Buchter caster structure, the roller is carried by a bracket having a serrated face. A stem of the caster is provided with a pair of pins, with the brackets being pivotally carried by one pin. A pawl is pivotally carried by the second pin for engagement by the serrated face portion of the bracket to provide a latching of the structure in any one of a plurality of different height positions.

In U.S. Pat. No. 2,281,769, Gustav F. Hochreim discloses a leveling system for a scale in which a pair of cam-like support elements are connected to a common shaft which extends between the side walls of the scale and can be rotated to adjust the height of the front portion of the scale. The cam surfaces are provided with a plurality of cut-out portions that selectively receive a locking pin carried by a spring biased, pivotally mounted arm. The rear portion of the scale is supported by rollers.

Albert J. Matter, in U.S. Pat. No. 2,793,467, shows a foot adjuster for an appliance wherein one end of the foot is pivoted to the baseplate of the appliance, and the other end is adjustably vertically positioned about the pivot by a U-shaped cam which is movable toward and from the pivot by a screw. A spring urges the front end of the shoe upwardly to maintain the shoe in engagement with the cam.

In U.S. Pat. No. 3,393,846, John P. Cannon et al disclose an automobile jug having pivotally mounted adjustable feet selectively retained in position by screws extending through an upper portion of the feet into the body of the jug.

Richard P. Bergeson discloses, in U.S. Pat. No. 3,750,989, an adjustable three-point support for an appliance, such as a dishwasher. The support includes a pair of threaded legs adjacent the front of the dishwasher and an adjustable member at the rear thereof. An elongated element extends from the front of the appliance to permit adjustment from the front of the adjustable member at the rear so as to effect desired leveling of the appliance rear portion.

Means for leveling an appliance, such as a refuse compactor, are disclosed in U.S. Pat. No. 3,753,400 of Frank E. Miller, which patent is owned by the assignee hereof. As shown therein, the compactor is adjustably supported on four support elements which are adjustably threaded into the base of the compactor.

Lauren W. Guth, in U.S. Pat. No. 3,927,853, shows a household appliance leveling system permitting the appliance to be leveled after it has been installed in an undercounter position wherein a wedge member can be selectively moved forward or rearward by a tension member so as to swing a pivotally mounted leveling bracket at the rear of the appliance suitably to urge the free end of the bracket against the floor so as to raise the rear portion of the appliance. Threaded support elements are provided at the front of the appliance.

A tilt mechansim for a projector is illustrated in U.S. Pat. No. 3,968,949, of Frank A. Romano, Jr. The mechanism includes a base about which a load-carrying platform is swung in a vertical plane. Selective swinging of the platform relative to the base causes the base to raise the front or rear of the projector above a flat support surface.

In U.S. Pat. No. 4,068,815, of Gerhard K. Losert, a self-locking support mechanism is disclosed for leveling an appliance relative to the floor. The device includes a rotatable cam member having a pivot point, a cam surface to contact the floor for height adjustment, and a radius surface relative to the pivot point. The cam member rotates by a pin through the pivot point and a slot in the support member, and the pin is slidably movable within the slot. The slot and support end wall are spaced from each other and converge toward each other in a direction away from the floor so that upon rotating the cam member, the pin is moved within the slot away from the floor and the cam member radius surface abuts the support end wall to lock the cam member in the adjusted disposition.

At times it is desirable to prevent sliding movement of the support for the appliance. It has heretofore been conventional to provide boots for underlying the caster wheels of caster devices, and one illustrative example of such a boot is disclosed in U.S. Pat. No. 2,033,207 of Edward H. Schultz, Jr. As shown therein, a boot for the caster wheel is provided in the form of a yoke having a baseplate which is positionable under the wheel to define means for supporting the caster on the subjacent floor.

William V. Meyer, in U.S. Pat. No. 2,698,454, shows a caster device having a boot with an opening in the bottom plate so that upon vertical selective positioning of the boot relative to the wheel axis, the wheel is either retracted within the boot or exposed downwardly through the opening.

SUMMARY OF THE INVENTION

The present invention comprehends an improved support and leveling system that is particularly adapted for use with appliances, such as domestic refuse compactors, that are commonly installed in a confined space, such as an under-counter space within a kitchen.

Refuse compactors are relatively small appliances, yet are typically quite heavy and include a rigid, horizontal base member spaced closely to the floor. A refuse receiving receptacle and compacting mechanism are typically supported on the horizontal base member. When positioned within an under-counter space, it is desirable that a refuse compactor be level and carefully aligned with the surrounding cabinetry, to which the compactor is normally secured once finally in place. While the construction of some under-counter appliances, such as dishwashers, typically defines an access space below the appliance through which support and leveling means can be readily adjusted when the appliance is in the under-counter position, the base member and compacting mechanism associated with typical refuse compactors do not permit such access to the support and leveling means, particularly to such means at the rear of the appliance.

It is an object of the present invention to provide a support and leveling means for a refuse compactor, or similar appliance, which permits the appliance to be readily moved into and out of a confined space and which provides non-rolling, stable support of the appliance.

It is another object of the present invention to provide separate, adjustable support and leveling means disposed generally at each corner of the appliance base member, with each such means being accessible from the exterior of the appliance.

It is a further object of the invention to provide support and leveling means for a refuse compacting apparatus wherein each of said means is mounted on and adjustably secured to a common, rigid base member that supports the compacting mechanism and refuse receptacle.

In the illustrated embodiment, the support and leveling system of the present invention permits facilitated movement of a refuse compactor into an under-counter space and facilitates adjustment of the leveling means thereof for level, aligned installation of the compactor in the under-counter space.

The support and leveling mechanism includes adjustable means at the front of the compactor providing for facilitated support and leveling thereof.

In the illustrated embodiment, a support element is pivotally mounted to a portion of the baseplate of the appliance. Means are provided for securing the support element to the baseplate in adjusted disposition about the pivot thereof. An upper, arcuate surface of the support element engages the undersurface of the compactor baseplate. A lower, arcuate surface of the support element engages the supporting subjacent floor so that the appliance is supported directly through the support element between the baseplate and subjacent floor.

In the illustrated embodiment, the support element is formed of a synthetic resin material with the lower arcuate surface being relatively smooth so as to permit relatively free sliding movement thereof on the subjacent floor, thus providing facilitated movement of the appliance into and from the under-counter space while supporting the appliance in a stable, non-rolling relationship to the floor.

The invention comprehends the provision of a cradle device which may be selectively positioned under the lower surface of the support elements to provide a non-slip support means, when desirable. The cradle is swingably mounted so as to provide a flat, lower surface extending horizontally in facial engagement with the subjacent floor surface.

The invention further comprehends the provision of adjustable roller means at the rear of the appliance. In the illustrated embodiment, a movable mounting bracket is provided for adjustably mounting a roller to the appliance baseplate at each of the rear sides of the compactor.

The rear rollers permit separate, independent adjustment of the height of both rear side portions of the appliance, and the appliance to be easily moved inwardly and outwardly of the under-counter space, as desired.

The front support elements may be adjusted with the appliance disposed within the under-counter space. Each of the rear adjustable rollers and the front support elements may be readily adjusted with the appliance disposed in an accessible position outwardly of the under-counter space. The appliance can be readily moved into the space to check for the proper level disposition thereof, moved back outwardly from the space to effect any final adjustment desired, and then returned to the space for final installation. The support and leveling means for effecting such facilitated movement and adjustable leveling is extremely simple and economical.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
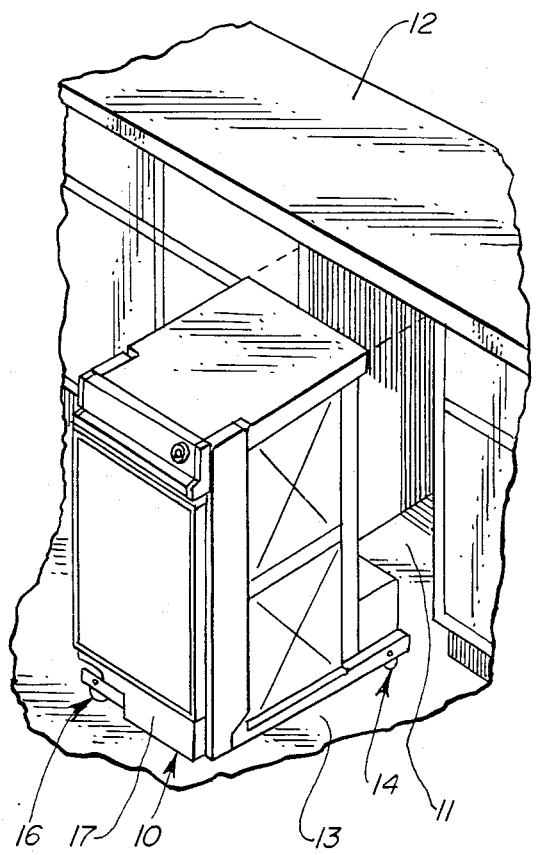
FIG. 1 is a fragmentary perspective view of an appliance arranged for installation in an under-counter space, having support and leveling means embodying the invention.

In the exemplary embodiment of the invention as disclosed in the drawing, an appliance generally designated 10 illustratively comprises a refuse compactor adapted for installation in an under-counter space 11 of a kitchen counter 12. The appliance is adapted to be moved on the subjacent horizontal supporting surface, or floor, 13, as illustrated in FIG. 1.

The present invention is concerned with the support and leveling of the appliance in the confined under-counter space 11. As indicated briefly above, the invention comprehends the provision of roller means generally designated 14 at the rear 15 of the appliance, and slide support means generally designated 16 at the front 17 of the appliance. The support and leveling means 14 and 16 cooperate to permit facilitated movement of the appliance into and from the under-counter space 11 so as to permit facilitated installation of the appliance in the space 11 in a desired, accurately leveled disposition.

Figure 2:
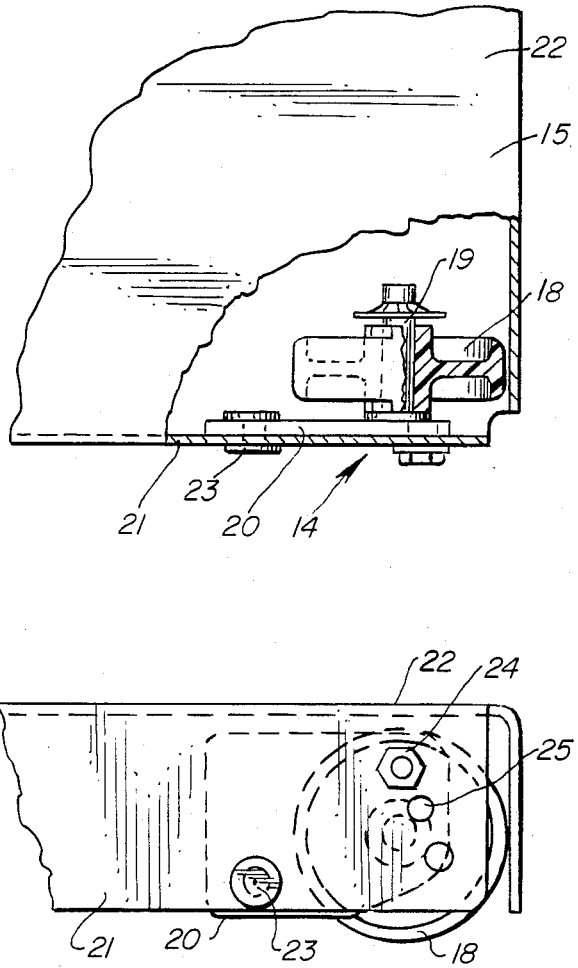
FIG. 2 is a fragmentary rear plan view with a portion broken away to illustrate the mounting of the rear roller means on the appliance.
Figure 3:
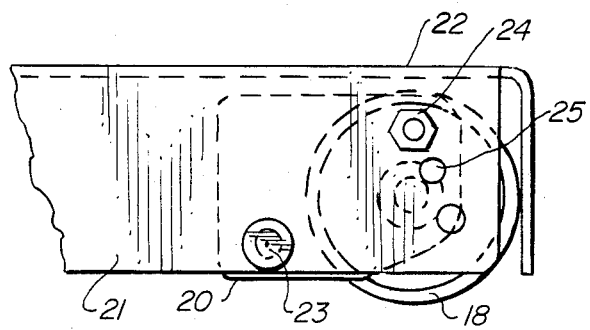
FIG. 3 is a fragmentary side elevation thereof.

Referring now more specifically to FIGS. 2 and 3, the rear roller means 14 comprises pivotally mounted means for providing rolling movement of the rear portion of the appliance and supporting the rear portion in a desired disposition above the floor 13. More specifically, as shown in FIG. 2, the roller means includes a roller wheel 18 rotatably mounted on an axle 19 secured to a mounting plate 20 pivotally mounted to a side flange 21 of the base plate or base 22, of the appliance, by a pivot 23.

The mounting plate 20 is secured in any one of a plurality of different pivotal positions by a screw 24 extending through any one of a plurality of through openings 25 in the side flange 21 spaced arcuately about the axis of pivot 23, as seen in FIG. 3. In FIG. 3, the wheel 18 is disposed in its uppermost position relative to the base 22.

Figure 4:
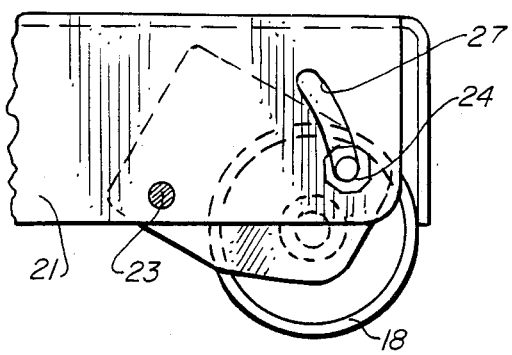
FIG. 4 is a fragmentary side elevation of a modified form of rear roller means embodying the invention.

Referring to FIG. 4, means for providing an infinite adjustment of the vertical disposition of the wheel 18 relative to base 22 is shown to comprise an arcuate slot 27 in the side flange 21 in lieu of the spaced openings 25, permitting the mounting plate 20 to be clamped to the side flange 21 by the screw 24 in an infinitely adjustable manner about the axis of pivot 23.

Figure 5:
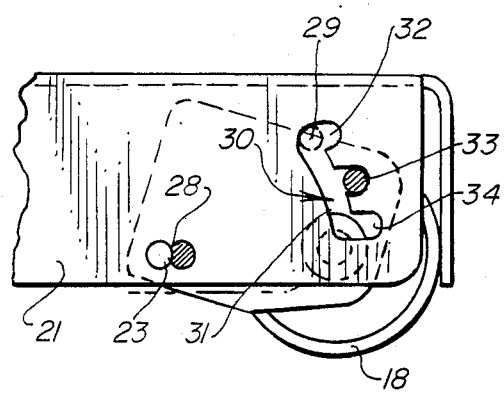
FIG. 5 is a fragmentary side elevation of still another modified form of rear roller means embodying the invention.
Figure 7:
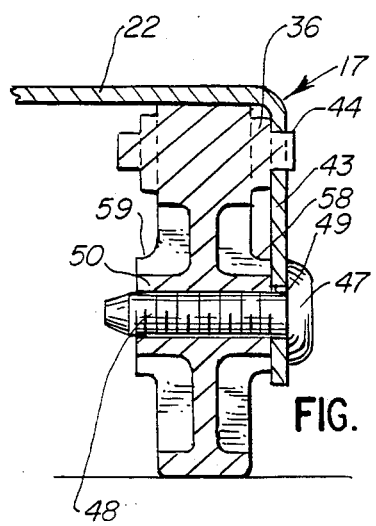
FIG. 7 is a transverse section taken substantially along the line 7—7 of FIG. 6.

Still another form of adjusting means is illustrated in FIG. 5 wherein the pivot 23 extends through a horizontally elongate slot 28 in the side flange 21, and the shank 29 of the screw 24 is selectively movable in a branched slot generally designated 30 having an arcuate portion 31 extending about the axis of pivot 23 and a plurality of horizontally extending branch slot portions 32, 33 and 34 for selectively receiving the shank 29 at different elevations for correspondingly retaining the wheel 18 at different elevations relative to the appliance base 22. As will be obvious to those skilled in the art, the movement of the screw shank to and from the branch slot portions 32, 33 and 34 is effected by loosening of the screw, permitting the shank to move into the arcuate portion 31 and then moving the shank upwardly or downwardly to the desired branch slot portion, whereupon the shank is moved into that slot portion and resecured. The elongated slot 28 permits the movement into and from the different branch slot portions.

Referring now to FIGS. 1 and 6-9, the front slide support means 16 comprises a pair of slide supports mounted one each at the left and right sides of the front portion 17 of the appliance base. The slide supports are similar and the construction thereof will be understood from the description of the left slide support illustrated in FIGS. 6-9.

More specifically, each slide support means 16 includes a support element 35 having a pivot portion 36 defining a pivot axis 37. The upper portion 38 of the support element includes a first arcuate support surface 39 defined by a radius $R_1$ about pivot axis 37. A lower portion 40 of the support element includes a second, generally arcuate, support surface 41 which is defined about an axis 42 spaced from pivot axis 37 and, thus, the various portions of surface 41 are spaced differently from the pivot axis 37. Support surface 41 may have a circular configuration, defined about a radius $R_2$, if desired, although it is not absolutely necessary that this surface be truly circular.

Figure 6:
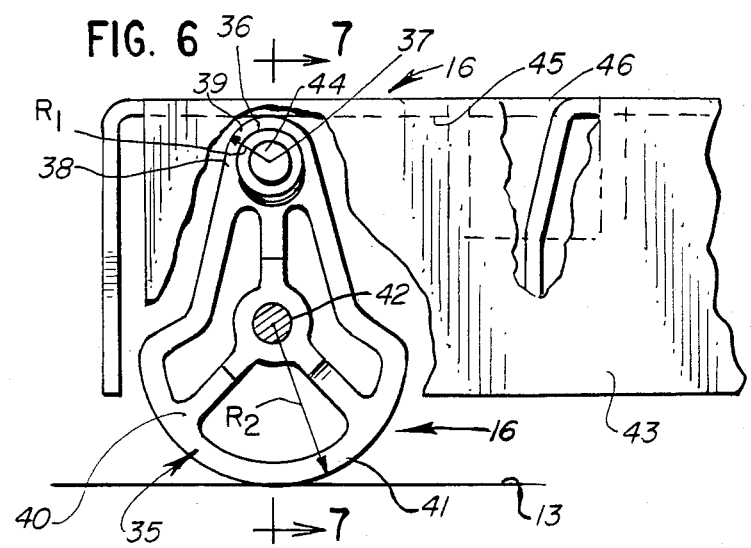
FIG. 6 is a fragmentary front elevation with a portion removed to illustrate the front support and leveling mechanism of the invention.

Pivot portion 36 of the support element is pivotally mounted to the front flange 43 of the base 22 by a pivot means 44. The pivot is located suitably to cause the upper arcuate surface 39 to engage the undersurface 45 of the top wall 46 of the base 22 in all pivotal dispositions of the support element. Lower support surface 41, as shown in FIG. 6, rests on the surface of subjacent floor 13 and, thus, the support element extends directly between the base 22 and the underlying floor 13 to provide positive support of the appliance without applying a substantial supporting load to the pivot means 44.

Figure 8:
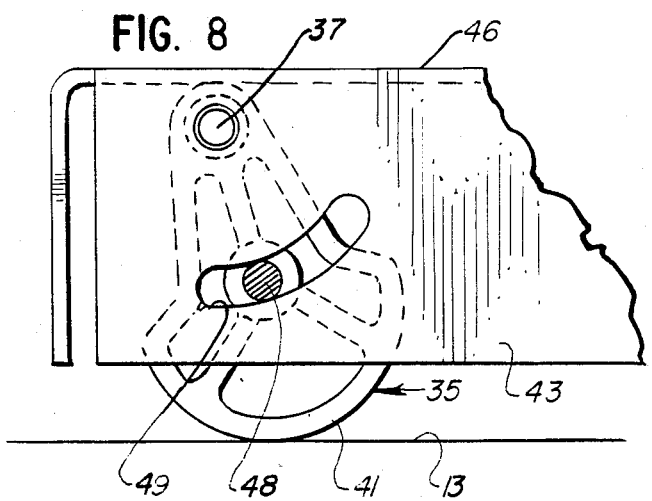
FIG. 8 is a fragmentary front elevation thereof.

The support element is secured in infinitely adjustable disposition about the pivot axis 37 by a screw 47 having a shank 48 extending through an opening 49 in the front flange 43 and threaded into a securing portion 50 of the support element coaxially of axis 42 of the lower arcuate support surface 41. The opening 49, as seen in FIG. 8, is arcuate about the axis 37, permitting the support element to be clamped to the front flange 43 in adjusted disposition with any desired portion of the lower support surface 41 resting on the floor surface 13, as desired. The pivotal movement of the support element about axis 37 thusly correspondingly varies the vertical extent of the support element, thereby adjusting the elevation of the base 22 at that support element so as to provide facilitated leveling of the appliance thereat.

Arcuate slot 49 should be positioned, as shown in FIG. 8, so that clockwise rotation of the support element 35 about axis 37 always results in downward movement of screw 48 and, hence, generally downward movement of the lower portion 40 of element 35. This arrangement takes advantage of the tendency of element 35 to move in a clockwise direction as the screw 48 is tightened by clockwise rotation, and prevents inadvertent movement of element 35 away from floor 13 during tightening of screw 48.

It is preferable that support element 35 be mounted to the front flange 43 of the appliance with pivot axis 37 extending in a direction generally parallel to the direction of movement of the appliance, to minimize any tendency for the element 35 to move or slip from its secured, adjusted position as the appliance is slid along the surface of floor 13.

Arcuate surface 41 preferably comprises a slide surface so that the appliance may be slid on the floor 13 at the front portion 17 thereof while concurrently being rolled on rollers 14 at the rear portion thereof for facilitated movement of the appliance into and from the under-counter space 11.

Figure 9:
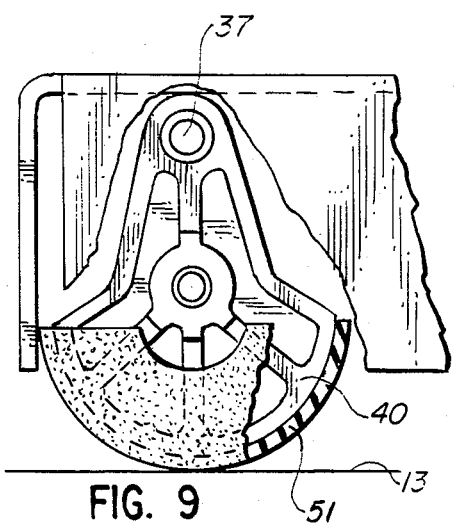
FIG. 9 is a fragmentary front elevation thereof showing the use of friction means on the lower support portion of the support element.

In certain installations, it may be desired to provide friction means on the lower portion 40 of the support element, and one such friction means is illustrated in FIG. 9. Thus, as shown in FIG. 9, a cradle device 51 may be associated with the support element. More specifically, in the embodiment of FIG. 9, element 51 comprises a cup-shaped cover which may be formed of a high friction material and adapted to be removably mounted or permanently molded about the lower portion 40 of the support element when desired. The cover may be sufficiently resilient to be retained on the support element portion 40 as by being stretched thereover as illustrated in FIG. 9.

Alternatively, the friction support means may comprise a pad 52 of high friction material, such as rubber, mounted to a lower flange portion 53 of a U-shaped support 54 having legs 55 and 56, straddling the support element 35 and provided with a relatively large opening 57 for free swinging movement of the support 54 about central hub portions 58 and 59 (FIG. 7) of element 35. The U-shaped support 54 may be formed of a resilient synthetic material so that legs 55 and 56 snap-fit over the hub portions 58 and 59.

Figure 11:
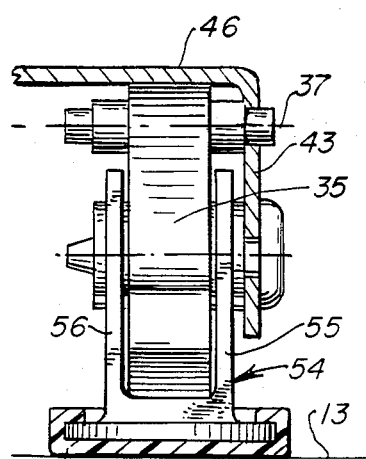
FIG. 11 is a vertical section taken substantially along the line 11—11 of FIG. 10.
Figure 10:
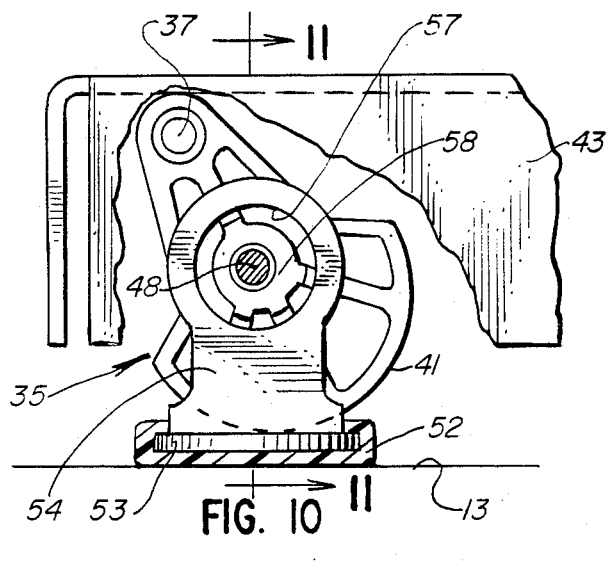
FIG. 10 is a fragmentary front elevation with portions broken away illustrating another form of friction means in association with the support element.

Thus, as seen in FIGS. 10 and 11, the friction pad 52 is selectively positioned lowermost below the support element with the lower surface 41 of the support element resting on the lower flange 53 of the U-shaped support 54. Thus, the friction pad 52 is disposed in horizontal facial engagement with the surface of floor 13 to provide a positive non-sliding support of the appliance on the floor.

The support element 35 is preferably formed of a strong, rigid synthetic resin, such as nylon, permitting the smooth lower support surface 41 to slide freely in the absence of the friction cover means. Thus, the support system defined by the roller means 14 and slide support means 16 allows a refuse compactor or other appliance to be slid across a floor with modest effort while yet preventing free rolling movement of the appliance, such free rolling movement being undesirable in installations where the appliance is used in a freestanding position rather than a secured under-counter position.

The foregoing disclosure of specific embodiments is illustrative of the broad inventive concepts comprehended by the invention.

Having described the invention, the embodiments of the invention in which an exclusive property or privilege is claimed are defined as follows:

1. In an appliance having a base defining a front portion, a rear portion, and a downwardly facing base surface, means for leveling and supporting the appliance on a subjacent supporting surface comprising:
   support means on the rear portion of the base;
   a pair of laterally spaced support elements on the front portion of the base, each support element defining an axis of pivoting extending in a front-rear direction and further defining a lower support surface having portions at different spacings from said axis and an upper arcuate support surface defined by a radius about said pivot axis; and
   mounting means for mounting said support elements to said base for pivotal, non-rolling movement about said axis, with said lower support surface slidably resting on said subjacent supporting surface to define any one of a plurality of different height supports of said base front portion, said mounting means being adjustable from the front of the base by effecting selective pivoting of the support element about said front-rear pivot axis, said upper support surface engaging said downwardly facing base surface.

2. The appliance support means of claim 1 wherein said lower support surface is circular and is defined by a radius having its center spaced from said pivot axis.

3. The appliance support means of claim 1 wherein said lower support surface is circular and is defined by a radius having its center spaced from said pivot axis, and said mounting means includes securing means disposed at said center.

4. The appliance support means of claim 1 wherein each of said upper support surface and lower support surface is circular, the radius of said lower support surface being substantially greater than the radius of said upper support surface.

5. The appliance support means of claim 1 wherein said mounting means includes clamp means for securing said elements in adjusted disposition.

6. The appliance support means of claim 1 wherein said base further defines a downwardly turned reinforcing flange, and said mounting means includes means for securing said support elements to said base flange.

7. The appliance support means of claim 6 wherein said securing means comprises means for locking the support elements to said base flange.

8. The appliance support means of claim 6 wherein each said support element includes a securing portion and said securing means comprises threaded clamp means received by said support element securing portion for clamping the support element to said base flange.

9. The appliance support means of claim 6 wherein said securing means comprises an arcuate slot in said base flange centered on said pivot axis, and clamp means extending through said slot for clamping the support element to said base flange.

10. The appliance support means of claim 6 wherein said securing means comprises an arcuate slot in said base flange centered on said pivot axis and extending arcuately unidirectionally upwardly toward said downwardly facing base surface from a lowermost end portion disposed substantially vertically below said pivot axis, and clamp means extending through said slot for clamping the support element to said base flange.

11. The appliance support means of claim 1 wherein sad support means on the rear portion of the base comprises roller means permitting combined sliding and rolling movement of said appliance on the subjacent supporting surface inwardly and outwardly through said front opening.

12. The appliance support means of claim 11 including means for vertically adjustably supporting the roller means on said rear portion of the base for correspondingly adjusting the spacing of said rear portion above the subjacent supporting surface.

13. The appliance support means of claim 11 including means for vertically adjustably supporting roller means on said rear portion of the base in any one of a plurality of discrete positions for correspondingly adjusting the spacing of said rear portion above the subjacent supporting surface.

14. The appliance support means of claim 11 wherein said rear base portion defines opposite lateral side portions, and each of said side portions defines a downwardly turned reinforcing flange, and wherein said roller means comprises a vertically adjustable roller carried by each of said reinforcing flanges.

15. The appliance support means of claim 14 further including a pair of mounting brackets and means for pivotally mounting one of said brackets to each of said reinforcing flanges, said rollers being rotatably mounted on said mounting brackets.

16. The appliance support means of claim 15 wherein said roller means is rotatable about an axis extending transversely of said pivot axis.

17. In an appliance having a base defining a front portion and a rear portion, means for leveling and supporting the appliance on a subjacent supporting surface comprising:
   a pair of laterally spaced support elements on the front portion of the base, each support element defining an axis of pivoting extending in a front-rear direction and further defining a lower support surface having portions at different spacings from said axis;
   mounting means for mounting said support elements to said base for pivotal, non-rolling movement about said axis, with said support surface slidably resting on said subjacent supporting surface to define any one of a plurality of different height supports of said base front portion, said mounting means being adjustable from the front of the base by effecting selective pivoting of the support element about said front-rear pivot axis;

roller means on said base portion for guiding the appliance into and from a mounting space; and means for adjusting the disposition of the roller means on said base portion for adjusting the elevation of the appliance as supported on said roller means in said space, said roller means being rotatable about an axis perpendicular to said front-rear direction.

18. The appliance support means of claim 17 wherein said support elements comprise non-rolling leveling means on said base front portion for cooperation with said roller means in leveling the appliance in said space.

19. The appliance of claim 17 said roller means is provided on said rear portion.

20. In an appliance having a base defining a front portion and a rear portion, means for leveling and supporting the appliance on a subjacent supporting surface comprising:

support means on the rear portion of the base;

a pair of laterally spaced support elements on the front portion of the base, each support element defining an axis of pivoting extending in a front-rear direction and further defining a lower support surface having portions at different spacings from said axis; and mounting means for mounting said support elements to said base for pivotal, non-rolling movement about said axis, with said support surface slidably resting on said subjacent supporting surface to define any one of a plurality of different height supports of said base front portion, said mounting means being adjustable from the front of the base by effecting selective pivoting of the support element about said front-rear pivot axis.

21. The appliance support means of claim 20 wherein each said means extending through said openings includes a pivot post on each said support element pivotably received in said opening means.

22. The appliance support means of claim 20 wherein each said means extending through said openings includes threaded elements threaded one each to said support elements and clamping said support elements to said flange.

23. The appliance support means of claim 20 wherein said base defines a downturned flange and each said mounting means comprises a pair of through openings in said flange and means extending through one of said openings for securing said support elements to said flange in any one of a plurality of angularly related positions about the axis thereof.

24. The appliance support means of claim 20 wherein said base defines a downturned flange and each said mounting means comprises a pair of through openings in said flange and means extending through said openings for securing said support elements to said flange in any one of a plurality of angularly related positions about the axis thereof, one of said openings comprising a circular opening and the other of said openings comprising an arcuate slot extending coaxially and downwardly clockwise of said circular opening, each said means extending through said circular opening including a pivot post on said support element pivotably received in said circular opening, and a threaded element extending through said arcuate slot and being threaded to said support element for clamping said support element to said flange.

25. In an appliance having a base defining a front portion and a rear portion, means for leveling and supporting the appliance on a subjacent supporting surface comprising:

support means on the rear portion of the base;

a pair of laterally spaced support elements on the front portion of the base, each support element defining an axis of pivoting extending in a front-rear direction and further defining a lower support surface having portions at different spacings from said axis;

mounting means for mounting said support elements to said base for pivotal, non-rolling movement about said axis, with said support surface slidably resting on said subjacent supporting surface to define any one of a plurality of different height supports of said base front portion, said mounting means being adjustable from the front of the base by effecting selective pivoting of the support element about said front-rear pivot axis; and securing means openable from the front of the base for securing each said support element in any one of a plurality of different angularly related positions about said pivot axis.

26. The appliance support means of claim 25 wherein said friction means comprises a cover formed of resilient material removably fitted about said lower portion of the support element.

27. The appliance support means of claim 25 wherein said friction means comprises a U-shaped carrier having legs pivotally mounted about a portion of said support element, and a lower flange portion, said friction means being disposed on said flange portion.

28. In an appliance having a base defining a front portion and a rear portion, means for leveling and supporting the appliance on a subjacent supporting surface comprising:

support means on the rear portion of the base;

a pair of laterally spaced support elements on the front portion of the base, each support element defining an axis of pivoting extending in a front-rear direction and further defining a lower support surface having portions at different spacings from said axis;

mounting means for mounting said support elements to said base for pivotal, non-rolling movement about said axis, with said support surface slidably resting on said subjacent supporting surface to define any one of a plurality of different height supports of said base front portion, said mounting means being adjustable from the front of the base by effecting selective pivoting of the support element about said front-rear pivot axis; and friction means selectively positionable to underlie said support surface in frictional engagement with the subjacent supporting surface to prevent free sliding movement of said support element on said subjacent supporting surface, said securing means including a hub-like securing portion on said support element and said friction means comprising a U-shaped carrier having legs pivotally mounted about said securing portion, and a disc-shaped lower flange portion defining an annular periphery, said friction means comprising a resilient element having an annular peripheral portion removably secured to said flange portion annular periphery.

29. In an appliance having a base defining a front portion and a rear portion, means for leveling and supporting the appliance on a subjacent supporting surface comprising:

support means on the rear portion of the base;

a pair of laterally spaced support elements on the front portion of the base, each support element defining an axis of pivoting extending in a front-rear direction and further defining a lower support surface having portions at different spacings from said axis;

mounting means for mounting said support elements to said base for pivotal, non-rolling movement about said axis, with said support surface slidably resting on said subjacent supporting surface to define any one of a plurality of different height supports of said base front portion, said mounting means being adjustable from the front of the base by effecting selective pivoting of the support element about said front-rear pivot axis; and friction means selectively positionable to underlie said support surface in frictional engagement with the subjacent supporting surface to prevent free sliding movement of said support element on said subjacent supporting surface.

30. The appliance support means of claim 20 including a flange extending downward from said base and wherein each said mounting means comprises means defining openings in said flange and means extending through one of said openings for securing said support element to said flange in any one of a plurality of angularly related positions about the axis thereof.

* * * * *